US012201573B2

(12) United States Patent
Yan et al.

(10) Patent No.: US 12,201,573 B2
(45) Date of Patent: Jan. 21, 2025

(54) MASSAGE DEVICE

(71) Applicants: Bo Yan, Guangdong (CN); Junpeng Wu, Shenzhen (CN)

(72) Inventors: Bo Yan, Guangdong (CN); Junpeng Wu, Shenzhen (CN)

( * ) Notice: Subject to any disclaimer, the term of this patent is extended or adjusted under 35 U.S.C. 154(b) by 0 days.

(21) Appl. No.: 18/664,269

(22) Filed: May 14, 2024

(65) Prior Publication Data

US 2024/0299239 A1 Sep. 12, 2024

Related U.S. Application Data

(63) Continuation-in-part of application No. 18/635,094, filed on Apr. 15, 2024, which is a continuation of application No. 18/372,701, filed on Sep. 26, 2023, now Pat. No. 11,957,634, which is a continuation of (Continued)

(51) Int. Cl.
*A61H 19/00* (2006.01)
*A61H 23/00* (2006.01)
*A61H 23/02* (2006.01)

(52) U.S. Cl.
CPC ............. *A61H 19/30* (2013.01); *A61H 19/44* (2013.01); *A61H 23/0254* (2013.01); *A61H 2201/1215* (2013.01); *A61H 2201/149* (2013.01); *A61H 2201/1676* (2013.01)

(58) Field of Classification Search
CPC ........ A61H 19/00; A61H 19/30; A61H 19/32; A61H 19/34; A61H 19/40; A61H 19/44; A61H 19/50; A61H 21/00; A61H 7/002; A61H 7/004; A61H 7/005; A61H 23/0263
See application file for complete search history.

(56) References Cited

U.S. PATENT DOCUMENTS 2,263,219 A * 11/1941 Lybarger ................ A61H 21/00
219/229
5,657,765 A * 8/1997 Est ......................... A61H 19/50
128/842

(Continued)

FOREIGN PATENT DOCUMENTS

CN 102429805 A 5/2012
CN 103393530 A 11/2013

(Continued)

OTHER PUBLICATIONS

Definition of the term "through", MerriamWebster.com.*

(Continued)

*Primary Examiner* — Tu A Vo
(74) *Attorney, Agent, or Firm* — Andrew C. Cheng

(57) ABSTRACT

A massage device includes a shell, a first massage portion and a first driving unit. The shell is configured to be inserted into a human body along an insertion direction. A moving space is defined in a middle portion of the shell in the insertion direction and extends through a lateral wall of the shell to define an opening therein. The moving space communicates with an external environment out of the shell through the opening of the lateral wall of the shell. The first massage portion extends into the moving space of the shell. The first driving unit is arranged in the shell and connected to the first massage portion. Under the driving of the first driving unit, the first massage portion moves along an annular trajectory.

14 Claims, 9 Drawing Sheets

Related U.S. Application Data application No. 18/118,749, filed on Mar. 8, 2023, now Pat. No. 11,771,619.

(56) References Cited

U.S. PATENT DOCUMENTS

| | | | | |
|---|---|---|---|---|
| 5,843,006 | A * | 12/1998 | Phillips | A61H 7/005 601/134 |
| 6,190,339 | B1 * | 2/2001 | Imazaike | A61H 7/005 601/135 |
| 6,422,993 | B1 * | 7/2002 | Hudson | A61H 19/34 600/38 |
| 9,119,765 | B2 * | 9/2015 | Topolev | A61H 19/44 |
| 11,369,545 | B1 * | 6/2022 | He | A61H 7/001 |
| 11,491,078 | B1 * | 11/2022 | He | A61H 7/005 |
| 11,633,327 | B1 * | 4/2023 | Wu | A61H 23/0263 601/70 |
| 12,036,176 | B1 * | 7/2024 | Wang | A61H 23/0263 |
| 2007/0129599 | A1 * | 6/2007 | Nan | A61H 23/0263 600/38 |
| 2009/0306561 | A1 * | 12/2009 | Naganuma | A61H 39/04 601/137 |
| 2010/0160840 | A1 * | 6/2010 | Murphy | A61H 7/005 601/112 |
| 2014/0309565 | A1 * | 10/2014 | Allen | A61H 19/44 601/46 |
| 2015/0148592 | A1 * | 5/2015 | Kanbar | A61H 19/34 600/38 |
| 2015/0272814 | A1 * | 10/2015 | Chen | A61H 15/0085 601/97 |
| 2016/0051438 | A1 * | 2/2016 | Hahr | A61H 23/0263 601/72 |
| 2016/0184178 | A1 * | 6/2016 | Hahr | A61H 23/02 600/38 |
| 2020/0085681 | A1 | 3/2020 | Haddock et al. | |
| 2022/0160577 | A1 * | 5/2022 | Cai | A61H 9/0057 |
| 2023/0355463 | A1 * | 11/2023 | Cirillo-Schmidt | A61H 23/0263 |
| 2024/0108538 | A1 * | 4/2024 | Chen | A61H 23/0254 |

FOREIGN PATENT DOCUMENTS

| | | | | |
|---|---|---|---|---|
| CN | 204890546 | U | | 12/2015 |
| CN | 111419660 | A | | 7/2020 |
| CN | 211095924 | U | | 7/2020 |
| CN | 11434412 | A | | 4/2022 |
| CN | 217409236 | U | | 9/2022 |
| EA | 015002671-0001 | S | | 11/2022 |
| EP | 3925588 | A1 | | 12/2021 |
| EP | 4406526 | A1 | | 7/2024 |
| IT | 20100010 | A1 | | 10/2011 |
| JP | 2006110289 | A | | 4/2006 |
| JP | 2007296299 | A | | 11/2007 |
| KR | 20220096692 | A | * | 7/2022 |
| WO | 2015096179 | A1 | | 7/2015 |

OTHER PUBLICATIONS

Definition of the term “limit”, Oxfordlearnersdictionary.com.*

Extended European Search Report Dated May 7, 2024 for corresponding European Application No. 23211161.7.

Notice of Refusal Dated Jul. 9, 2024 for Corresponding Japanese Patent Application No. 2023-200162.

Notice of Public Submission of counterpart Japanese Patent Application No. 2023-200162 Issued on Aug. 20, 2024.

Supplementary document for procedures of counterpart Japanese Patent Application No. 2023-200162 Issued on Aug. 15, 2024.

Notice of Public Submission of Counterpart European Patent Application No. 23211161.7 Issued on Sep. 19, 2024.

* cited by examiner

MASSAGE DEVICE

CROSS-REFERENCE TO RELATED APPLICATIONS

This application is continuation in part application of application Ser. No. 18/635,094, filed on Apr. 15, 2024, which is a continuation application of application Ser. No. 18/372,701, filed on Sep. 26, 2023, and now patented as U.S. Pat. No. 11,957,634 on Apr. 16, 2024, which is a continuation application of application Ser. No. 18/118,749, filed on Mar. 8, 2023 and now patented as U.S. Pat. No. 11,771,619 on Oct. 3, 2023, the entire contents of which are hereby incorporated by reference.

TECHNICAL FIELD

The present application relates to the technical field of sex toys, and in particular to a massage device.

BACKGROUND

With the improvement of the human living, in addition to material aspects, more spiritual needs are being pursued. Sexual life has gained more and more attention as a spice of human life, and varied sex toys are developed to add pleasures to sexual life, which satisfy human physiological and psychological needs to a certain extent.

Generally, a sex toy includes a massage head and a motor driving the massage head to do linear reciprocating motion, thereby providing stimulation to a sensitive area of the human body, such as the clitoris, the vagina and the like. However, such sex toy stimulates the human body has a limited stimulation range and unsatisfactory stimulation effect.

SUMMARY

An object of this application is to provide a massage device, which has an enlarged stimulation range and better stimulation effect.

To achieve the above object, this application provides a massage device that includes:

- a shell configured to be inserted into a human body along an insertion direction, a moving space being defined in a middle portion of the shell in the insertion direction and extending through a lateral wall of the shell to define an opening therein, the moving space communicating with an external environment out of the shell through the opening of the lateral wall of the shell;
- a first massage portion extending into the moving space of the shell; and
- a first driving unit arranged in the shell and connected to the first massage portion;
- wherein the first massage portion moves along an annular trajectory under the driving of the first driving unit.

Compared with the prior art, the present application has the following beneficial effects:

- i) the first massage portion may swing back and forth between the interior and exterior of the shell for the moving space defined in the shell, thereby getting a larger moving range and generating greater force on the human body, enhancing the stimulation effect;
- ii) the first massage portion moves along an annular trajectory to knead the vaginal wall or the rectum wall, providing a more comfortable sexual experience, and thus the users are more likely to reach orgasm with the help of the present massage device.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

Figure 1:
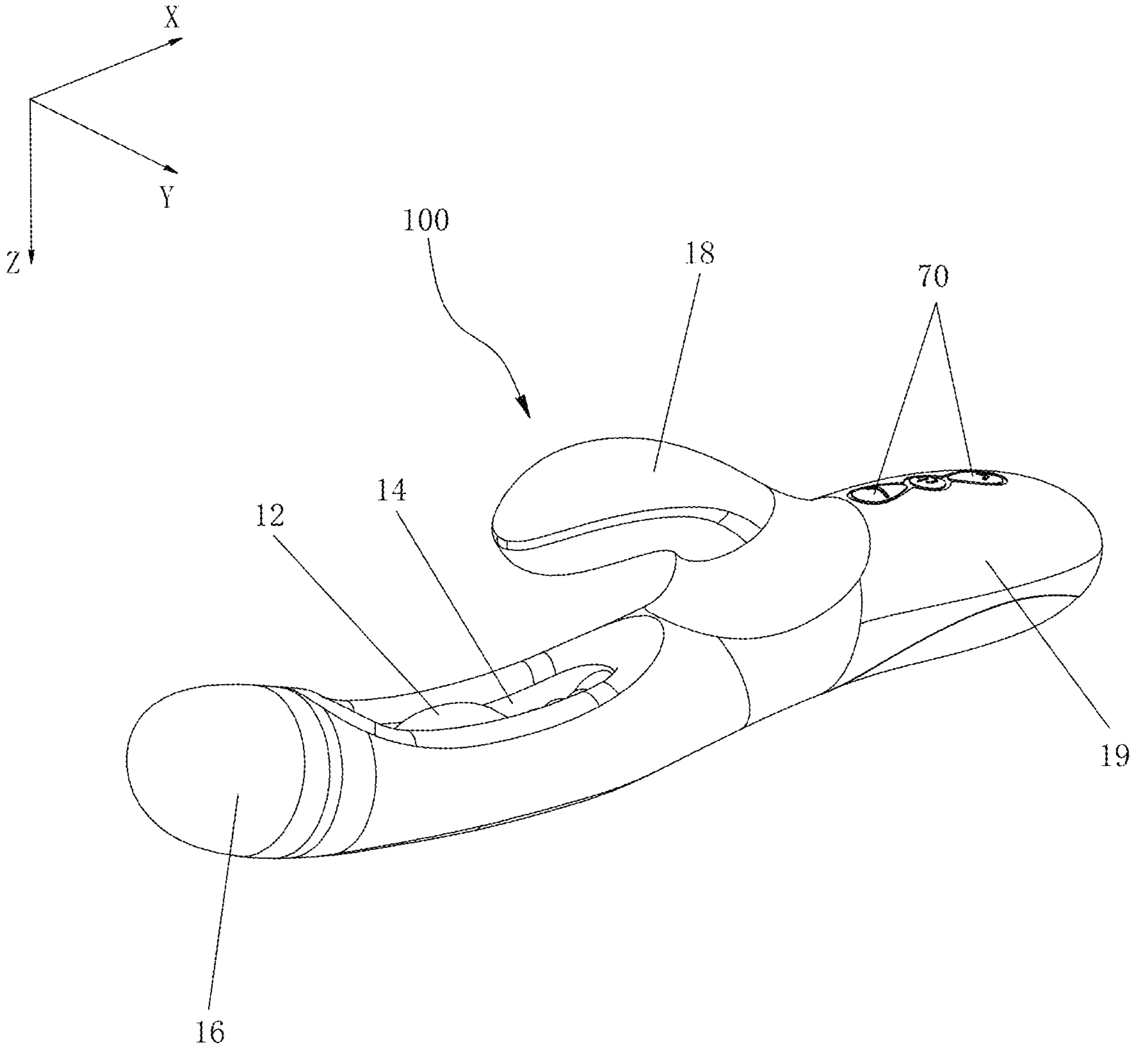
FIG. 1 is a schematic, assembled view of a massage device according to an embodiment of the present application.
Figure 2:
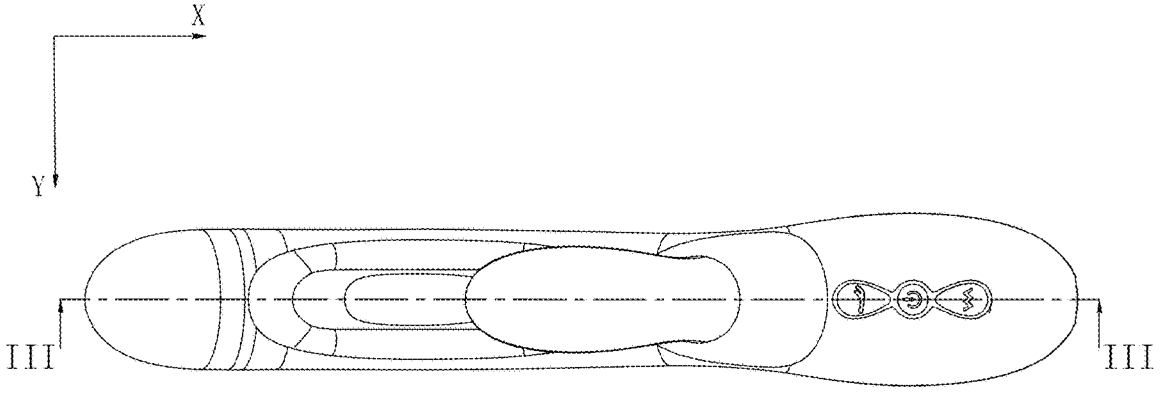
FIG. 2 is a top plan view of the massage device of FIG. 1.

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIGS. 1-4, a massage device according to an embodiment of the present application is shown. In this embodiment, the massage device 100 includes a shell 10, a first driving unit 30 mounted in the shell 10, and a first massage portion 12 driving by the first driving unit 30.

In this embodiment, the shell 10 is elongated and generally rod-shaped, and a moving space 14 is defined in a middle portion of the shell 10. The first massage portion 12 extends into the moving space 14, and is movable in the moving space 14. In this embodiment, the moving space 12 extends through two opposite sides of the shell 10 along its lateral direction, i.e., Z-direction in the drawings, and thus two openings 15 are defined at two sides, such as top and bottom sides, of a lateral wall of the shell 10, respectively. The moving space 14 communicates an exterior environment out of the shell 10 through the openings 15.

Under the driving of the first driving unit 30, the first massage portion 12 is capable of extending into the exterior environment out of the shell 10 via each of the openings 15, thereby stimulating a part of the human body around the shell 10. Particularly, the shell 10 is configured to be inserted into a rectum or a vagina of the human body along its longitudinal direction, i.e., X-direction in the drawings, and the first massage portion 12 is configured to knead a rectum wall or a vaginal wall.

As shown in the drawings, the opening 15 of shell 10 is generally perpendicular to the Z-direction. The first massage portion 12 moves in a longitudinal plane of the shell 10, such as the XZ-plane, which is generally perpendicular to the opening 15. During the movement of the first massage portion 12, its massage surface, such as its upper and lower surfaces in the Z-direction, may extend outwardly to the exterior environment out of the shell 10 through the openings 15. Alternatively, the first massage portion 12 may totally return into the moving space 14 of the shell 10, so as to get greater swing amplitude when it extends outwardly next time, thereby obtaining a greater stimulation force. In some embodiments, the massage surface of the first massage portion 12 is convex, and may be provided with protrusions or patterns to further enhance the stimulation effect.

In an embodiment, the first driving unit 30 includes a swing arm 32. The swing arm 32 is arranged in the shell 10 with one end thereof connected to the first massage portion 12, thereby driving the first massage portion 12 to do reciprocating motion. Specifically, the swing arm 32 is slidably connected to the shell 10 by a first shaft 40, allowing the first massage portion 12 to do linear reciprocating motion relative to the shell 10. At the same time, the swing arm 32 is rotatably connected to the shell 10 by a second shaft 42, allowing the first massage portion 12 to do reciprocating swinging relative to the shell 10. The linear reciprocating motion and reciprocating swinging of the first massage portion 12 are superimposed, finally forming an annular trajectory, such as a circular trajectory, an elliptical trajectory and the like. Thus, the first massage portion 12 is driven to knead the vaginal wall or the rectum wall, stimulating the crus of clitoris or the prostate.

By means of setting the moving space 14, the first massage portion 12 may swing back and forth between the interior and exterior of the shell 10, thereby getting a larger moving range and generating greater force on the human body, enhancing the stimulation effect. Preferably, the moving space 14 is elongated, making the first massage portion 12 have a larger swinging radius. It should be understood that the setting of the moving space 14 is to make the interior space and exterior space of the shell 10 be communicated with each other, so as to increase the moving range of the first massage portion 12. In some embodiments, the moving space 14 of the shell 10 may be a blind groove with one side being opened and another side being closed. For example, the moving space 14 may only penetrate the upper side of the lateral wall of the shell 10, so that the first massage portion 12 can extend into the external environment at the upper side of the shell 10.

Figure 3:
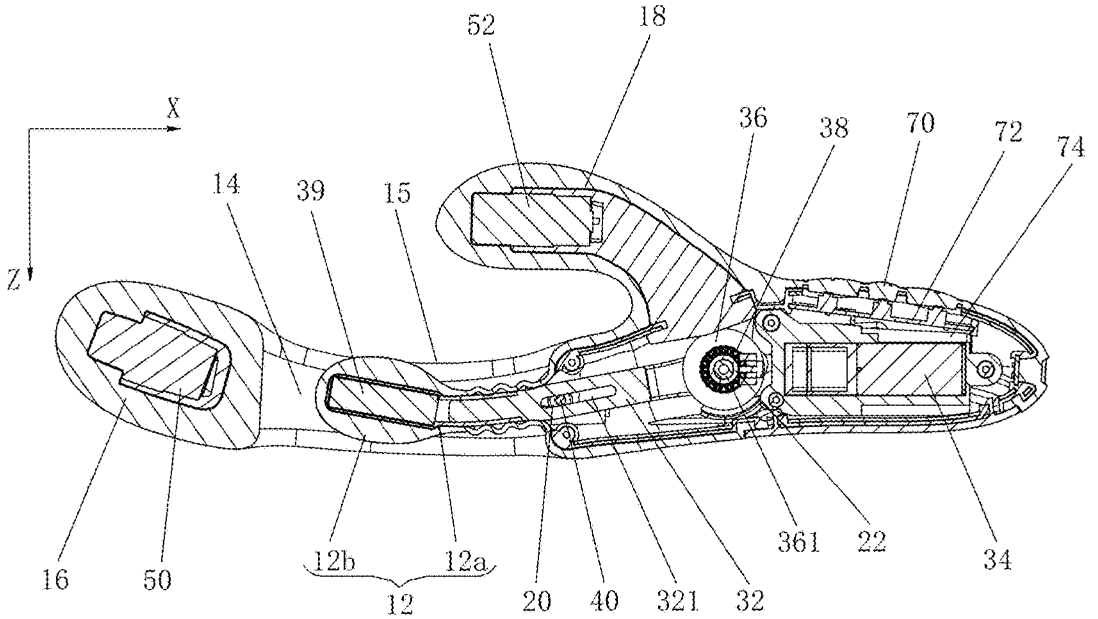
FIG. 3 is a cross sectional view of the massage device taken along line III-III of FIG. 2.
Figure 4:
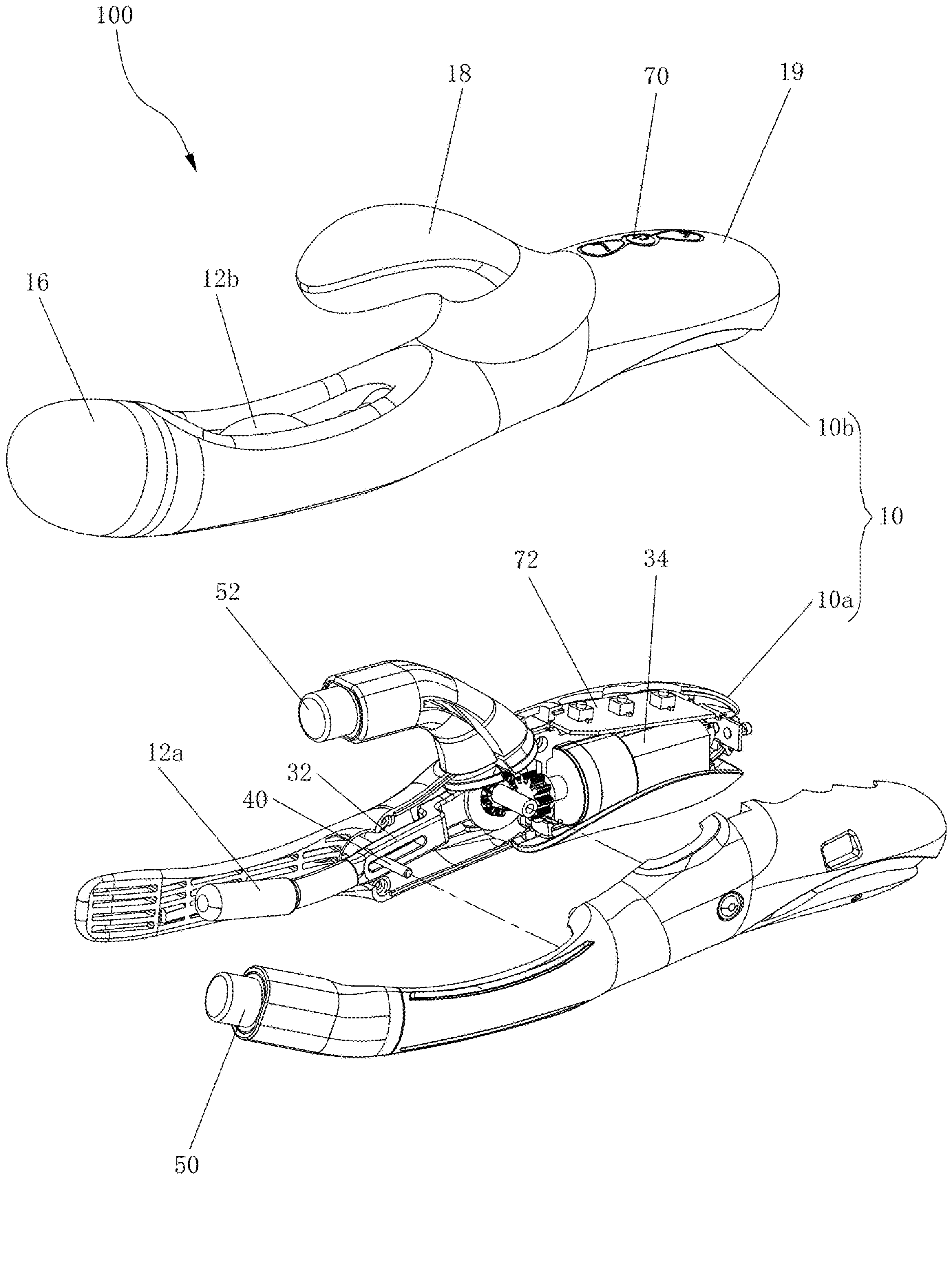
FIG. 4 a schematic, exploded view of the massage device of FIG. 1.

In this embodiment, as shown in FIGS. 3-4, the shell 10 may be a double-layer structure, and includes an inner shell **10*a* and an outer shell 10*b* covering the inner shell 10*a*. The inner shell 10*a* is made of hard materials such as plastic, metal, etc., which has a relatively high strength and thus provides support for the components mounted inside the shell 10, such as the first driving unit 30 and etc. The outer shell 10*b* is made of flexible materials such as silicone, rubber, and etc., and has a soft touch. In other embodiments, the outer shell 10*b*** may be made of other flexible materials that can directly contact the skin, which is not limited in the present application.

As shown in FIG. 3, the first massage portion 12 may be a double-layer structure, and includes a hard layer **12*a* and a soft layer 12*b* covered on the hard layer 12*a*. The hard layer 12*a* may be part of the inner shell 10*a*, while the soft layers 12*b* may be part of the outer shell 10*b*. In this embodiment, the soft layer 12*b* of the first massage portion 12 is integrally connected to the outer shell 10*b*, and wrinkles 13 are formed at a joint of the soft layer 12*b* and the outer shell 10*b*. The hard layer 12*a* of the first massage portion 12 is disconnected from the inner shell 10*a* at a position corresponding to the wrinkles 13, making the first massage portion 12 be easier to deform during movement. The first massage portion 12** thus may have a larger swing and/or movement amplitude, thereby having a larger stimulation range.

Figure 5:
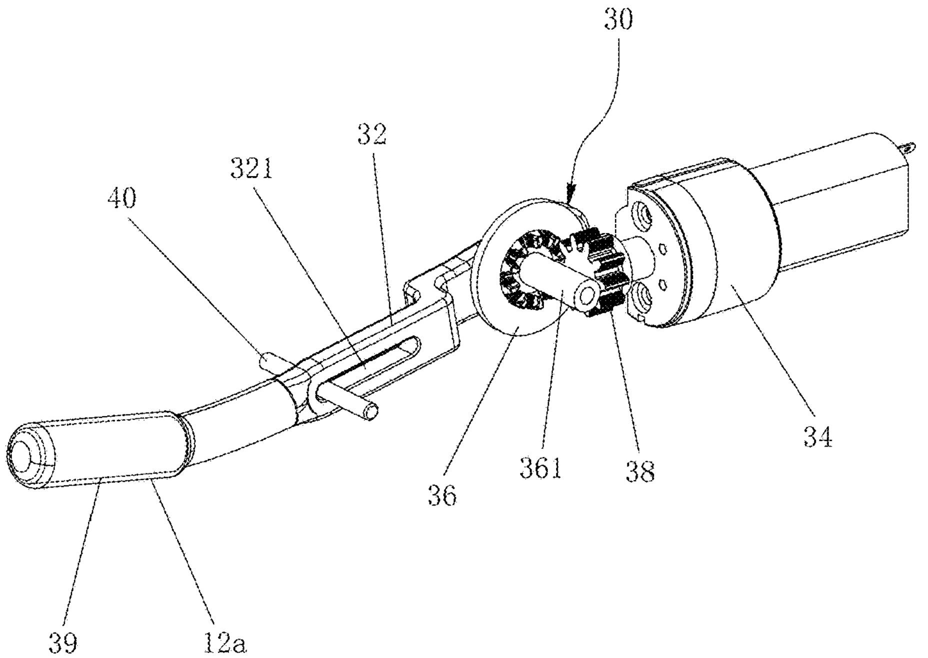
FIG. 5 is a schematic view of a first massage portion and its driving unit of the massage device.
Figure 6:
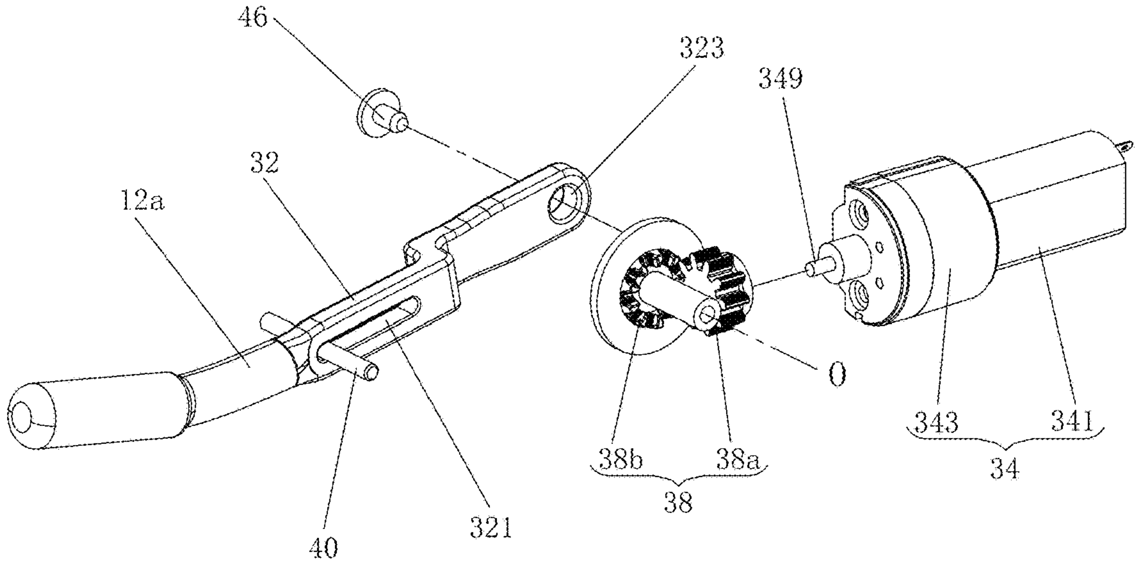
FIG. 6 is an exploded view of FIG. 5.
Figure 6A:
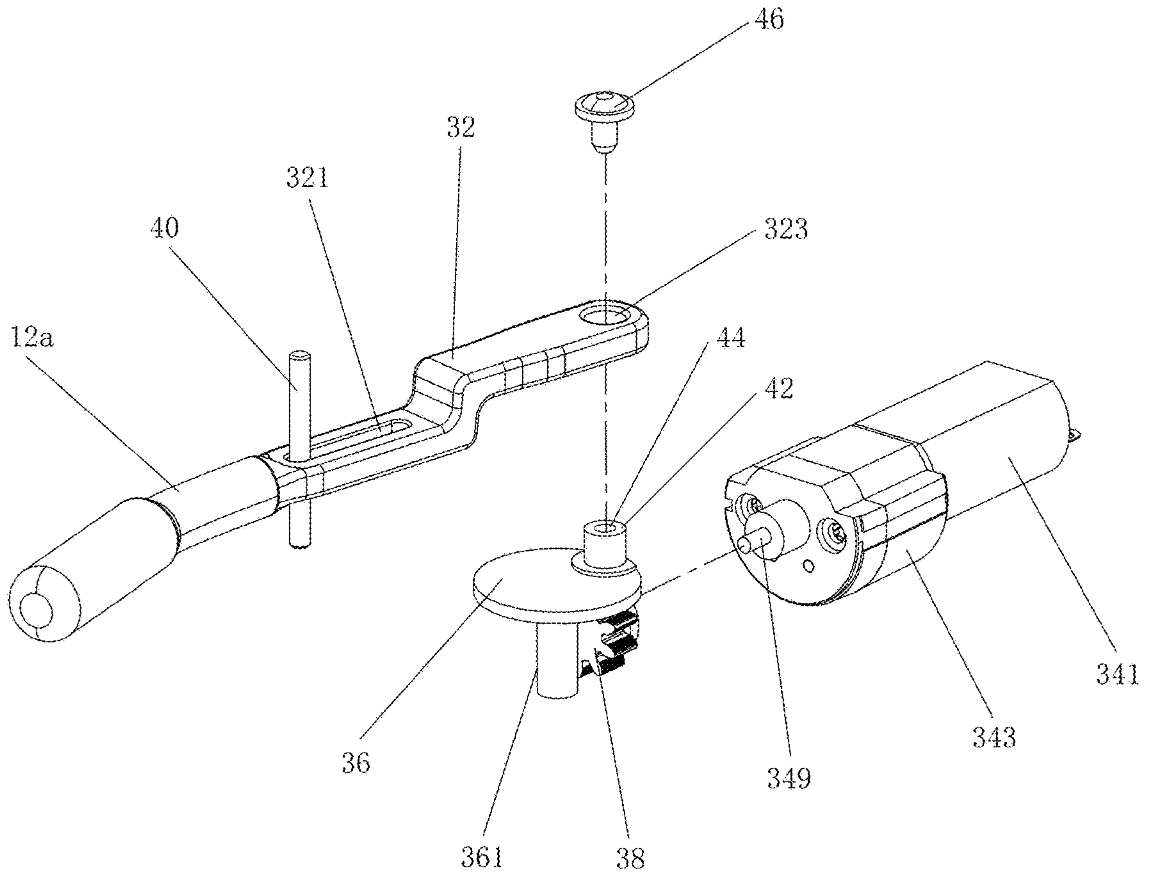
FIG. 6*a* is an exploded view of FIG. 5 viewed from another aspect.
Figure 7:
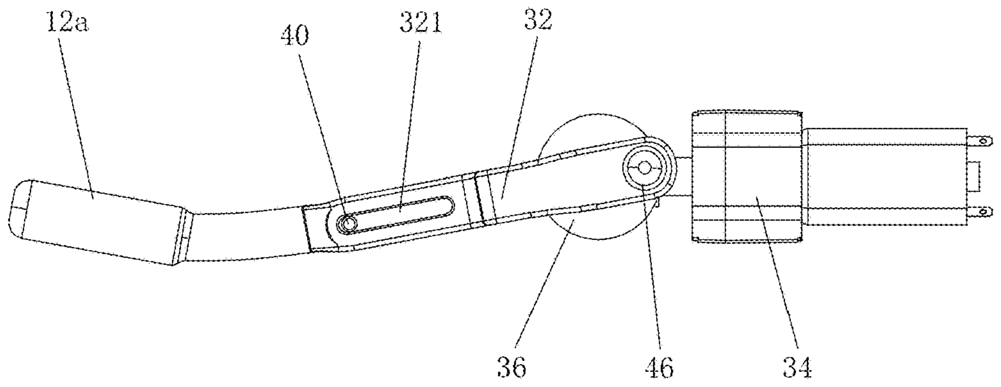
FIG. 7 is a top plan view of FIG. 5.

In an embodiment, as shown in FIGS. 5-7, the swing arm 32 is generally an elongated plate, wherein its longitudinal direction is consistent with the longitudinal direction of the shell 10 (i.e., X-direction), and its width direction is consistent with a depth direction of the moving space (i.e., the Z-direction). The end of the swing arm 32 is inserted into the hard layer **12*a* of the first massage portion 12, and is fixedly connected to the hard layer 12*a* through snap-fitting, welding, bonding, interference fitting, and etc., so as to drive the entire first massage portion 12 to move. The hard layer 12*a* can better transmit the force of the swing arm 32 to the first massage portion 12, allowing the first massage portion 12** to have a larger swing and/or movement range, thereby having a larger stimulation range.

A middle portion of the swing arm 32 is slidably connected to the shell 10 through the first shaft 40, and another end of the swing arm 32 is pivotally connected to the shell 10 through the second shaft 42. The first shaft 40 and the second shaft 42 both extend along Y-direction, being perpendicular to the swing arm 32. When the second shaft 42 is driven to rotate around an axis O in a longitudinal plane, such as the XZ-plane, due to the limitation of the first shaft 40, the rotational motion of the second shaft 42 is transformed into the linear reciprocating motion of the swing arm 32 in the X-direction and the reciprocating swinging in the XZ-plane, finally driving the first massage portion 12 connected to the swing arm 32 to move along a circular trajectory.

In an embodiment, the swing arm 32 is provided with a sliding groove 321 at the middle portion thereof. The sliding groove 321 is elongated and extends along the X-direction. The first shaft 40 is inserted into the sliding groove 321, with a diameter generally equivalent to a width of the sliding groove 321 but much smaller than a length of the sliding groove 321. Through the cooperation of the first shaft 40 and the sliding groove 321, the swing arm 32 can slide relative to the first shaft 40 along its length direction; and the swing arm 32 and the first shaft 40 are relatively fixed in the width direction of the swing arm 32. In the illustrated embodiment, the shell 10 is provided with a first support seat 20 at a position corresponding to the first shaft 40, and an end of the first shaft 40 extends beyond the sliding groove 321 and is inserted into the first support seat 20.

Figure 8:
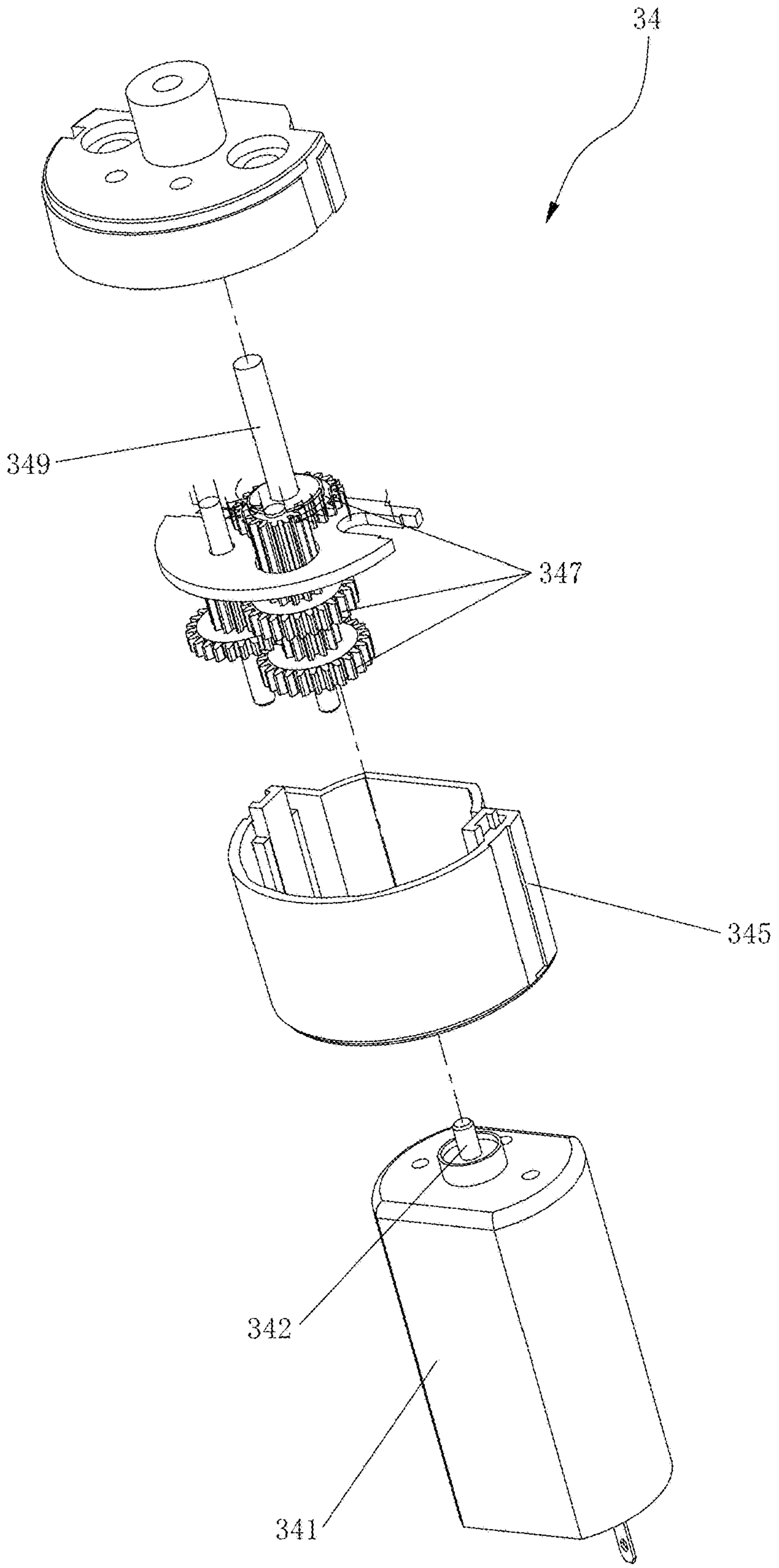
FIG. 8 is a further exploded view of a gearbox of the driving unit of FIG. 5.
Figure 9:
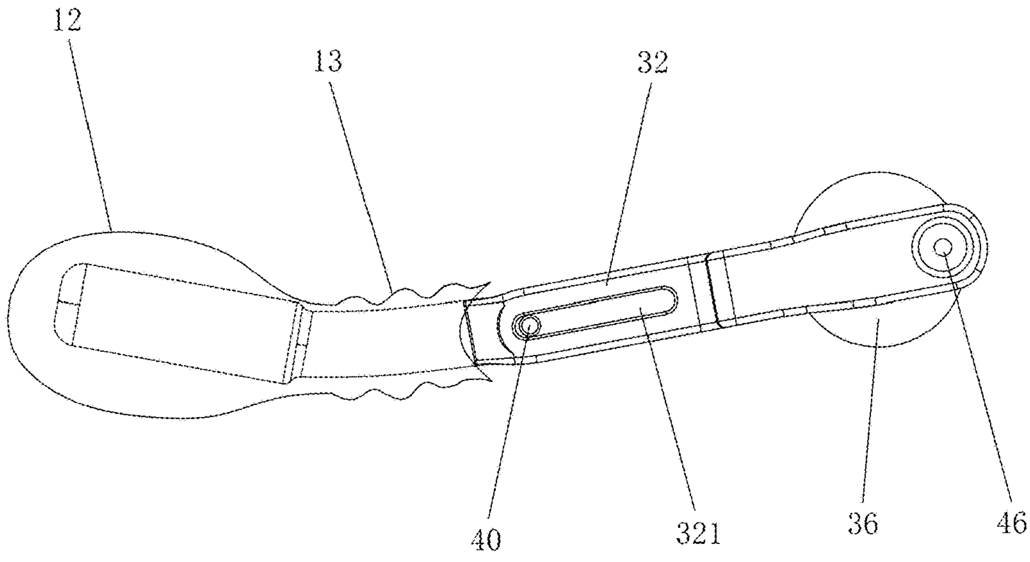
FIG. 9 is a schematic view of a first intermediate state of the first massage portion.
Figure 10:
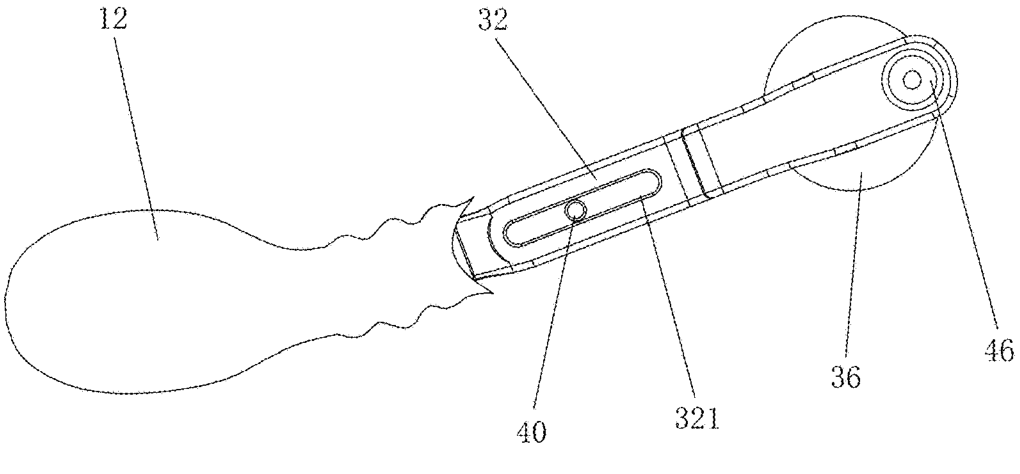
FIG. 10 is a schematic view of a second intermediate state of the first massage portion.
Figure 11:
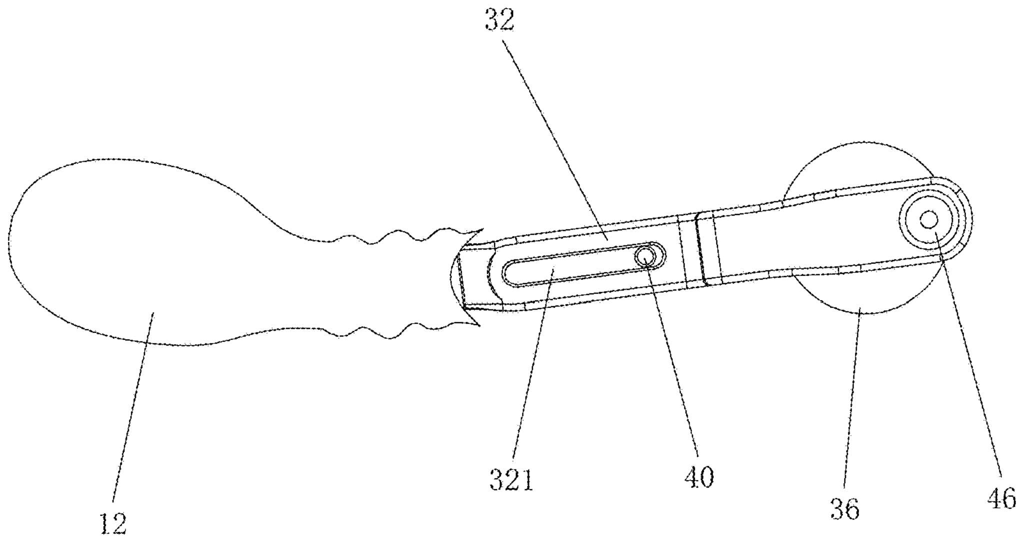
FIG. 11 is a schematic view of a third intermediate state of the first massage portion.
Figure 12:
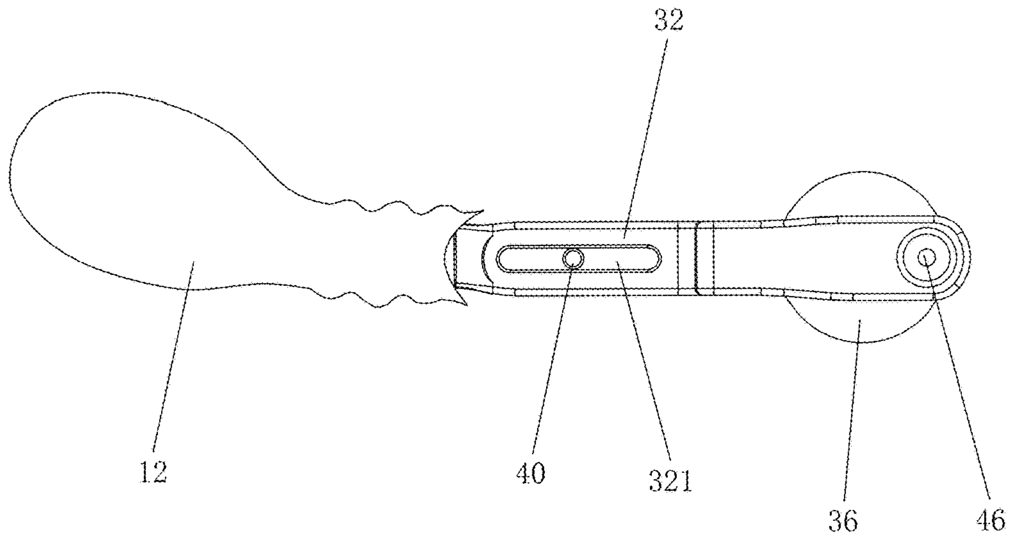
FIG. 12 is a schematic view of a fourth intermediate state of the first massage portion.

In an embodiment, the first driving unit 30 further includes a gearbox 34 and a rotary member 36 connected to the gearbox 34 for power transmission. Referring to FIG. 8, the gearbox 34 includes a motor 341 and a gear unit 343. The motor 341 serves as a driving component of the massage device 100 and has an output shaft 342 rotating at high-speed. The gear unit 343 includes a gear housing 345 and a plurality of gears 347 arranged in the gear housing 345. The gears 347 mesh with each other, and a reduction ratio of the whole gear unit 343 can be determined according to the gear ratios between the meshed gears 347. In an embodiment, the reduction ratio of the gear unit 343 is not less than 4:1 and not more than 100:1, and an output speed of the gearbox 34 is not exceed 1000 rpm. That is, a speed of an output shaft 349 of the gearbox 34 does not exceed 1000 rpm.

The rotary member 36 is connected to the output shaft 349 of the gearbox 34 in a transmission way. Under the driving of the gearbox 34, the rotary member 36 rotates about the axis O, wherein the axis O may be a central axis of the rotary member 36. Preferably, a speed of the rotary member 36 does not exceed 1000 rpm. The shell 10 is provided with a second support seat 22 at a position corresponding to the rotary member 36, and a rotating shaft 361 extends outwardly from the rotary member 36 into the second support seat 22. Preferably, the rotating shaft 361 is rotatably inserted into the second support seat 22. The second shaft 42 is eccentrically arranged on the rotary member 36, and rotates around the axis O under the driving of the gearbox 34.

In an embodiment, the second shaft 42 and the rotary member 36 may be integrally formed as one piece. The another end of the swing arm 32, which is away from the first massage portion 12, is provided with a shaft hole 323, and the second shaft 42 may be rotatably inserted into the shaft hole 323. Preferably, a fixing hole 44 is provided in the second shaft 42, and a rod portion of the fixing member 46, such as pins, rivets, screws, etc., is inserted into the fixing hole 44 of the second shaft 42, and a head portion of the fixing member 46 abuts against the swing arm 32 at a periphery of the shaft hole 323, so as to fix the second shaft 42 and the swing arm 32 in the Y-direction. In this way, the second shaft 42 will not automatically detach from the shaft hole 323 of the swing arm 32, ensuring the connection stability between the swing arm 32 and the rotary member 36.

In some embodiments, the second shaft 42 may be integrally formed on the swing arm 32, and a shaft hole 323 may be provided on the rotary member 36 corresponding to the second shaft 42. Alternatively, the second shaft 42 may be formed separately and then pivotally connected to the swing arm 32 and/or rotary member 36.

When the gearbox 34 is started, the output shaft 342 of the motor 341 rotates at high speed. After being slowed down by the gear unit 343, the rotary member 36 rotates at an appropriate speed, such as no more than 1000 rpm. The second shaft 42 rotates around the axis O, driving the swing arm 32 to rotate. The swing arm 32 generates displacement in both its length and width directions. Due to the engagement between the first shaft 40 and the sliding groove 321, the movement of the swing arm 32 in its length direction is not restricted, allowing the swing arm 32 to slide along its sliding groove 321 relative to the first shaft 40; and the movement of the swing arm 32 in its width direction is limited by the first shaft 40, causing the swing arm 32 to rotate relative to the second shaft 42 and thus generate swing.

Figure 13:
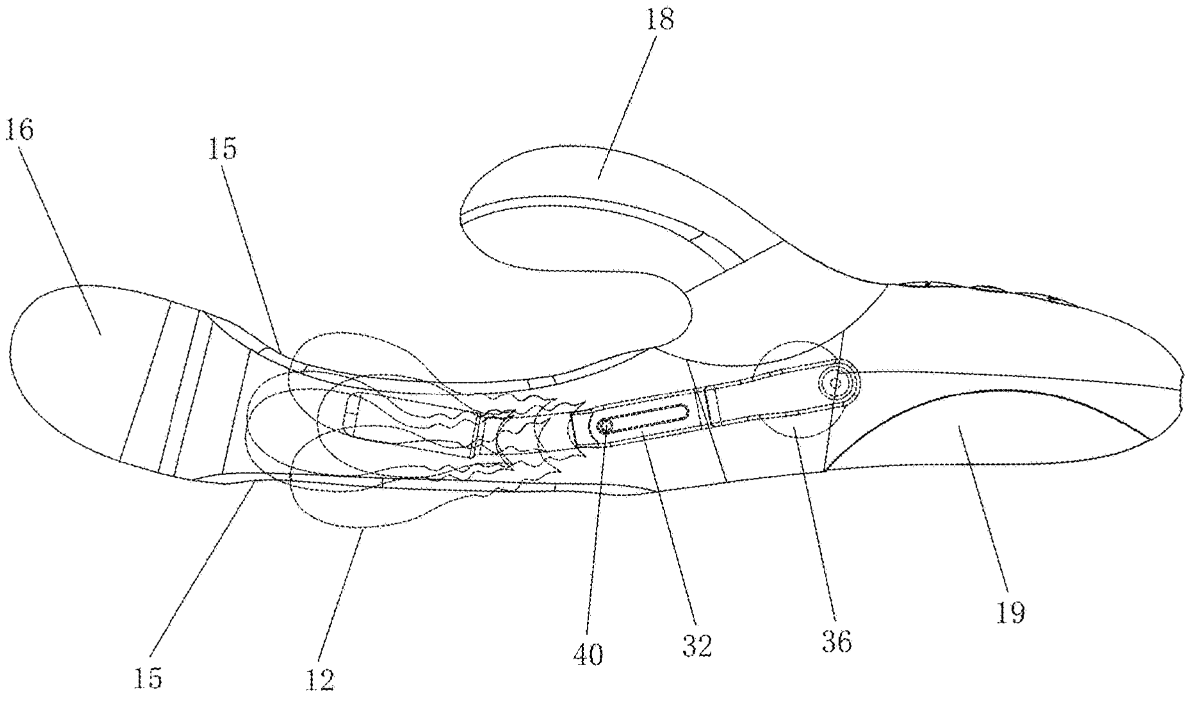
FIG. 13 is a schematic view of trajectory of the first massage portion.

As shown in FIGS. 9-12, as the rotation angle of the second shaft 42 around the axis O changes, the swinging center of the swing arm 32 continuously changes. The swing arm 32 simultaneously generates two different reciprocating movements, namely the linear reciprocating movement of the swing arm 32 in the X-direction and the reciprocating swing of the swing arm 32 in the XZ-plane. The combination of these two reciprocating movements drives the first massage portion 12 connected to the swing arm 32 to move along a circular or elliptical trajectory in the XZ-plane, as shown by the dashed line in FIG. 13.

Preferably, the length of the swing arm 32 is not less than 2 centimeters, allowing the swing arm 32 and the first massage portion 12 connected to the swing arm 32 to have a larger moving range, thereby an area of the human body kneaded by the first massage portion 12 being enlarged and accordingly a stimulation effect being better. In an embodiment, the trajectory of the first massage portion 12 is substantially an elliptical trajectory, wherein the major axis of the elliptical trajectory is not less than 1 centimeter. In another embodiment, the trajectory of the first massage portion 12 is substantially a circular trajectory, wherein the diameter of the circular trajectory is not less than 1 centimeter. In the illustrated embodiment, the swing arm 32 in whole is elongated in the X-direction, but its middle portion is bent to facilitate the arrangement of the gearbox 34. In some embodiments, the swing arm 32 may be a longitudinal, flat structure.

Compared to the existing massage devices which stimulate the human body by linear reciprocating motion, the first massage portion 12 of the present massage device moves along an annular trajectory, and thus kneads the sensitive area, such as the rectum or vagina of the human body. An area of the human body kneaded by the first massage portion 12 is enlarged and accordingly a stimulation effect is better. Moreover, the first massage portion 12 kneads the human body, which is similar to the motion of the hand, providing a more comfortable sexual experience.

In an embodiment, as shown in FIGS. 5-7, a steering unit 38 is provided between the rotary member 36 and the gearbox 34. By means of the steering unit 38, the direction of power transmission may be changed, facilitating the arrangement of the gearbox 34. In the illustrated embodiment, the gearbox 34 is arranged with its output shaft 349 being generally parallel to the swing arm 32. The steering unit 38 is located between the gearbox 34 and the swing arm 32. In this way, the space in the longitudinal direction of the shell 10 may be fully utilized, which is conducive to the miniaturization of the device.

Specifically, the steering unit 38 is a steering gear unit, and includes a plurality of gears that mesh with each other, such as a first gear 38*a*, a second gear 38*b*, and etc. The first gear 38*a* is mounted around the output shaft 349 of the gearbox 34, preferably the first gear 38*a* and the gearbox 34 are arranged coaxially. The second gear 38*b* is mounted around the rotating shaft 361 of the rotary member 36, preferably the second gear 38*b* and the rotary member 36 are integrally formed as on piece. The first gear 38*a* and the second gear 38*b* may be bevel gears and mesh with each other, achieving a change of 90 degrees in the direction of power transmission between the gearbox 34 and the rotary member 36.

In other embodiments, the direction of power transmission can be determined based on the internal space of the massage device 100, and the angle that needs to be changed is not limited to 90 degrees. Users can choose corresponding type of steering unit according to their needs to achieve direction change, which should not be limited by specific embodiments. In some embodiments, the steering unit 38 may also be integrated inside the gearbox 32, thereby a separate steering unit is no longer needed. Alternatively, in some embodiments, there is no need for direction change between the gearbox 34 and the rotary member 36, and thus the steering unit 38 may be omitted.

In an embodiment, the first driving unit 30 further includes a first vibration motor 39 mounted inside the first massage portion 12. When the first vibration motor 39 is activated, it drives the first massage portion 12 to vibrate at a certain frequency, stimulating the human body, such as the vagina or the rectum through vibration. It should be understood that during use, the vibration frequency of the first vibration motor 39 may be adjusted according to the user's needs.

In an embodiment, a front end of the shell 10, which is a portion of the shell 10 located at a front side of the moving space 14, acts as a second massage portion 16. A second driving unit, such as a second vibration motor 50, is set in the second massage portion 16. When the second vibration motor 50 is started, it drives the second massage portion 16 to vibrate at a certain frequency, stimulating the human body, such as the vagina or the rectum through vibration.

The second massage portion 16 and the first massage portion 12 are located at different positions of the shell 10, allowing for stimulating two different positions of the human body at the same time. Overall, the massage device 100 has a larger stimulation range and further enhanced stimulation effect.

In an embodiment, the shell 10 is further provided with a third massage portion 18. In the illustrated embodiment, the third massage portion 18 extends upwards and forwards by bending and extending from a rear end of the moving space 14 of the shell 10, generally above and separated from the first massage portion 12. A third driving unit, such as a third vibration motor 52, is set in the third massage portion 18. When the third vibration motor 52 starts, it drives the third massage portion 18 to vibrate at a certain frequency, stimulating the human body, such as the vulva, particularly the clitoris.

The third massage portion 18, the first massage portion 12, and the second portion section 16 are located at different positions on the shell 10, allowing for stimulating three different positions of the human body at the same time. Accordingly, the massage device 100 has a larger stimulation range and further enhanced stimulation effect.

In an embodiment, a rear end of the shell 10 serves as a handle 19, and buttons 70 are provided on the handle 19. A control circuit board 72 is provided in the handle 19, and forms a control circuit with the gearbox 34, the first and/or second and/or third vibration motors, and etc. The buttons 70 may be touch type buttons and/or mechanical buttons, and the users can control the operation of the massage device 100 through the buttons 70, including controlling the speed and direction of the gearbox 34, the vibration frequency of the first, second and third vibration motors, and etc. A battery 74, preferably a rechargeable battery, is provided inside the shell 10. The battery 74 is connected to the control circuit board 72 electrically and serves as a power source of the massage device 100.

Preferably, after being assembled with the first driving unit 30, the second vibration motor 50, the third vibration motor 52, the control circuit board 72, the battery 74, etc., the inner shell 10*a* is integrally formed by over-molding on the inner shell 10*a*, achieving good sealing effect for the components inside the shell 10. The outer shell 10*b* plays a waterproof and dustproof role, facilitating the cleaning and storage of the massage device 100. The end of the swing arm 32 may be integrally fixed in the hard layer 12*a* of the first massage portion 12 during the forming the soft layer 12*b*, which not only simplifies production and assembly, but also enhances the connection strength between the first massage portion 12 and the swing arm 32, allowing the first massage portion 12 to have a larger swing amplitude.

During use of the massage device 100 of this application, the user may activate the gearbox 34 of the first driving unit 30 to achieve a kneading effect to the vagina/rectum through the movement of the first massage portion 12; and/or, activate the first vibration motor 39 of the first driving unit 30 to achieve a stimulation effect to the vagina/rectum through the high-frequency vibration of the first massage portion 12; and/or, activate the second vibration motor 50 to enhance a stimulation effect to the vagina/rectum through the high-frequency vibration of the second massage portion 16; and/or, activate the third vibration motor 52 to enhance a stimulation effect to the vulva through the high-frequency vibration of the third massage portion 18, which can be more convenient to use.

By means of setting the moving space 14 in the shell 10, the present massage device 100 provides a wider moving range for the first massage portion 12, allowing the first massage portion 12 to have greater force and effectively improve the stimulation effect. Further, by means of slidable and rotatable cooperation between the swing arm 32 and the shell 10, the first massage portion 12 swings back and forth and moves back and forth simultaneously in the XZ-plane, finally forming an annular trajectory. This generates a kneading effect on the human body, enlarging the stimulation area and improving the sexual experience. In other embodiments, the shape of the shell 10 may be modified according to the part of the human body to be stimulated, which should not be limited to specific embodiments.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A massage device, comprising:

a shell configured to be inserted into a vagina or a rectum of a human body along an insertion direction, a lateral wall of the shell defined a moving space, the lateral wall comprising an outer lateral surface defining a first opening of the moving space, the moving space communicating with an outside environment out of the outer lateral surface of the shell, the moving space being defined in a middle portion of the shell in the insertion direction and extending through a lateral wall of the shell to define the first opening therein, the moving space communicating with an external environment out of the shell through the first opening of the lateral wall of the shell;

a first massage portion extending into the moving space of the shell, the first massage portion forming a soft layer, the soft layer comprising wrinkles; and a first driving unit arranged in the shell and connected to the first massage portion, the first massage portion connected to the first driving unit in a transmission way, the first massage portion being swingable in a lateral direction of the shell under the driving of the first driving unit, wherein when the first massage portion swings, a first end portion of the first massage portion is reciprocating to at least a first position inside the moving space of the shell and at least a second position in the outside environment out of the outer lateral surface of the shell, the first driving unit comprising a swing arm, a rotary motor and a rotary member comprising an eccentric shaft, the swing arm comprising a first end portion and a second end portion that is opposite from the first end portion, a length of the swing arm extends between the first end portion and the second end portion, the first end portion is positioned inside the first massage portion, the second end portion of the swing arm comprising a shaft hole for receiving the eccentric shaft of the rotary member, the swing arm comprising a first bend extending along a width direction of the swing arm and a second bend extending along a height of the swing arm to allow the first end portion of the swing arm to extend upward relative to the second end portion when a long side of the second end portion is oriented horizontally, the swing arm further comprising an elongated sliding groove positioned between the first end portion and the second end portion, the first bend is positioned between the elongated sliding groove and the shaft hole, the second bend is positioned between the elongated sliding groove and the first end portion, the elongated sliding groove is slidably connected to the shell via a first shaft, the first shaft is configured to slide within the elongated sliding groove;

wherein a rotary movement of the rotary member is configured to swing the swing arm by causing the elongated sliding groove to slide relative to the first shaft, thereby causing the first massage portion to move along an annular trajectory under the driving of the first driving unit and the wrinkles are arranged to extend over the second bend and are configured to allow the first massage portion to flexibly move in both a linear direction along a longitudinal direction of moving space and a height direction of the moving space to produce the annular trajectory.

2. The massage device according to claim 1, wherein the first massage portion moves in a longitudinal plane which is substantially perpendicular to a width direction of the first opening.

3. The massage device according to claim 1, wherein the first massage portion moves along a circular trajectory or an elliptical trajectory.

4. The massage device according to claim 1, wherein the first massage portion comprises a massage surface, and the massage surface is a convex surface for contacting a rectum wall of the rectum or a vaginal wall of the vagina.

5. The massage device according to claim 4, wherein patterns and/or protrusions are provided on the massage surface of the massage portion.

6. The massage device according to claim 1, wherein the moving space extends through two opposite sides of the lateral wall of the shell, and the first opening and a second opening are formed at two opposite sides of the lateral wall of the shell, respectively; and, wherein the first massage portion comprises two massage surfaces formed at two opposite lateral sides of the first massage portion, respectively, and one of the two massage surfaces is inside the moving space when the other one of the two massage surfaces extends into the external environment out of the shell.

7. The massage device according to claim 1, wherein the moving space extends through two opposite sides of the lateral wall of the shell, and two openings the first opening and a second opening are formed at two opposite sides of the lateral wall of the shell, respectively; and, wherein the first massage portion comprises two massage surfaces formed at two opposite lateral sides of the first massage portion, respectively, and the two massage surfaces extend into the external environment out of the shell through the two openings, respectively.

8. The massage device according to claim 1, wherein the first driving unit comprises a gearbox, the rotary member driving by the gearbox, and the swing arm connected between the rotary member and the first massage portion, the swing arm is rotatably and slidably connected to the shell, and an output speed of the gearbox does not exceed 1000 rpm.

9. The massage device according to claim 8, wherein the length of the swing arm in the insertion direction is not less than 2 cm.

10. The massage device according to claim 8, wherein the first massage portion comprises a hard layer and the soft layer covering the hard layer, and the swing arm is fixedly connected to the hard layer.

11. The massage device according to claim 10, wherein the shell includes an inner shell and an outer shell covering the inner shell, the soft layer of the first massage portion is integrally connected to the outer shell and the wrinkles are formed at a joint of the soft layer and the outer shell, and the hard layer is disconnected from the inner shell at a position corresponding to the wrinkles.

12. The massage device according to claim 8, wherein a second driving unit comprises a first vibration motor provided in the first massage portion.

13. The massage device according to claim 1, wherein the shell is elongated and substantially rod-shaped, a front end of the shell forms a second massage portion with a vibration motor mounted therein, a rear end of the shell forms a handle with buttons provided thereon, and the moving space is between the second massage portion and the handle.

14. The massage device according to claim 13, wherein the shell further comprises a third massage portion extending upwards and forward from a rear end of the moving space to an upper side above the moving space, and a third vibration motor is provided inside the third massage portion.

* * * * *